(12) United States Patent
MacInnis et al.

(10) Patent No.: US 11,928,736 B2
(45) Date of Patent: Mar. 12, 2024

(54) SYSTEM AND NETWORK FOR TIERED OPTIMIZATION

(71) Applicant: Allstate Insurance Company, Northbrook, IL (US)

(72) Inventors: David MacInnis, Lake Forest, IL (US); Jennifer Jabben, Deerfield, IL (US); Teresa J. Dalenta, Deerfield, IL (US)

(73) Assignee: Allstate Insurance Company, Northbrook, IL (US)

( * ) Notice: Subject to any disclaimer, the term of this patent is extended or adjusted under 35 U.S.C. 154(b) by 371 days.

(21) Appl. No.: 15/245,343

(22) Filed: Aug. 24, 2016

(65) Prior Publication Data

US 2018/0060969 A1    Mar. 1, 2018

(51) Int. Cl.
*G06Q 40/08*    (2012.01)
*G06F 16/58*    (2019.01)
*G06F 16/9535*    (2019.01)

(52) U.S. Cl.
CPC ......... *G06Q 40/08* (2013.01); *G06F 16/5866* (2019.01); *G06F 16/9535* (2019.01)

(58) Field of Classification Search
CPC .. G06Q 40/08; G06F 16/5866; G06F 16/9535
USPC .......................................................... 705/4
See application file for complete search history.

(56) References Cited

U.S. PATENT DOCUMENTS

| | | | |
|---|---|---|---|
| 7,774,217 B1 | 8/2010 | Yager et al. | |
| 7,801,748 B2 | 9/2010 | Bonissone et al. | |
| 8,301,487 B2 | 10/2012 | Rapperport et al. | |
| 8,719,134 B1 | 5/2014 | Huls et al. | |
| 2002/0099596 A1* | 7/2002 | Geraghty ........... | G06Q 30/0202 705/7.31 |
| 2003/0187700 A1 | 10/2003 | Bonissone et al. | |
| 2006/0100912 A1* | 5/2006 | Kumar .............. | G06F 17/30864 705/4 |
| 2007/0185743 A1 | 8/2007 | Jinks | |
| 2008/0221936 A1 | 9/2008 | Patterson | |
| 2009/0210256 A1 | 8/2009 | Upadhyayula et al. | |
| 2010/0070309 A1 | 3/2010 | Deede et al. | |

(Continued)

OTHER PUBLICATIONS

Dec. 11, 2017—(WO) International Search Report & Written Opinion—PCT/US17/048178.
Feb. 25, 2020—(CA) Office Action—App. No. 3,034,867.

*Primary Examiner* — Hai Tran
(74) *Attorney, Agent, or Firm* — Polsinelli PC

(57) ABSTRACT

Methods, systems, and computer-readable media, and apparatuses for optimizing policy underwriting and insurance policy coverage are described herein. Insurance information related to a new homeowner insurance policy may be retrieved from one or more insurance system databases. The insurance information may comprise an insurance policy premium. An unrestrained rating plan premium may be determined based on a plurality of premium components. The plurality of premium components may comprise at least one multiplicative factor and at least one additive factor determined from the insurance information. An underwriting score may be determined based on the unrestrained rating plan premium and the insurance policy premium. In response to determining that the underwriting score fails to meet a predetermined underwriting score threshold, the new homeowner insurance policy may be rejected.

20 Claims, 5 Drawing Sheets

(56) References Cited

U.S. PATENT DOCUMENTS

| | | | |
|---|---|---|---|
| 2011/0161116 A1* | 6/2011 | Peak | G06Q 40/08 |
| | | | 705/4 |
| 2012/0123806 A1* | 5/2012 | Schumann, Jr. | ............................ |
| | | | G08G 1/096775 |
| | | | 705/4 |
| 2013/0290023 A1 | 10/2013 | Hight et al. | |
| 2016/0012546 A1* | 1/2016 | Fields | G06Q 30/0201 |
| | | | 705/4 |
| 2016/0027121 A1* | 1/2016 | Lucia | G06Q 40/08 |
| | | | 705/4 |
| 2016/0078544 A1* | 3/2016 | Brady | G06Q 40/08 |
| | | | 705/4 |
| 2016/0171619 A1* | 6/2016 | Besman | G06Q 40/08 |
| | | | 705/4 |
| 2016/0225096 A1 | 8/2016 | Wells et al. | |
| 2016/0225098 A1* | 8/2016 | Helitzer | G16Z 99/00 |

\* cited by examiner

SYSTEM AND NETWORK FOR TIERED OPTIMIZATION

TECHNICAL FIELD

Various aspects of the disclosure relate to systems and methods for optimizing decisions. More specifically, aspects of the disclosure relate to optimizing coverage for an insurance policy based on a comparison between a currently charged premium and an unrestrained rating plan.

BACKGROUND

Generally, underwriting decisions are often based on categorizing an application across a large number of features and/or factors. A category for the application may then be determined using a number of business rules to determine if or when the application may contain any factors that exceed the maximum value that an entity may accept. The magnitude and complexity of the situation is further increased by the use of different factors and/or business rules depending on the type of coverage requested by the application.

In some instances, the magnitude and complexity of a rule-based underwriting process may be reduced by grouping factors together. Thus, the underwriting decisions and/or rules would examine combinations of factors rather than individual factors. While such an approach may reduce the number of factors, the approach may also significantly increase the complexity of the business rules. Additionally, in most instances, the newly created business rules do not allow for interaction between the factors.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods, systems, computer-readable media, and apparatuses for determining an unrestrained rating plan premium and optimizing underwriting decisions based on the unrestrained premium. In some examples, a tiered optimization premium-based insurance system may accept or may reject a new policy based on a comparison of an unrestrained premium with a currently charged premium. In other examples, a particular type of coverage, such as wind coverage, may be excluded or mandated on an insurance policy based on a comparison of an unrestrained premium with a currently charged premium. In another example, requirements for mitigation of conditions detected during an inspection may be waived based on a comparison of a lifetime premium with loss and a lifetime premium after mitigation. The lifetime premium with loss and the lifetime premium after mitigation may be determined based on an unrestrained premium and a currently charged premium.

Other features and advantages of the disclosure will be apparent from the additional description provided herein.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
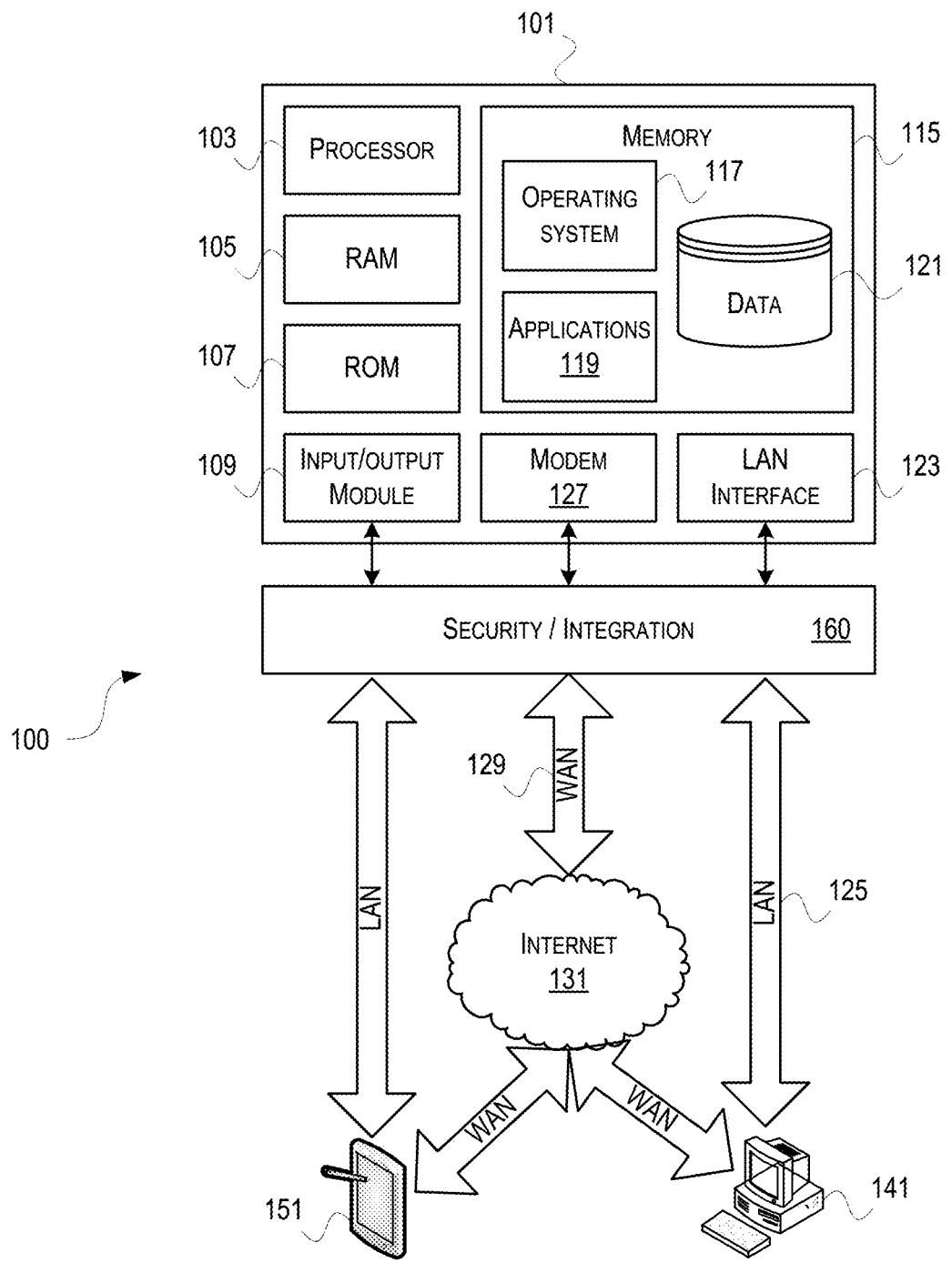
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer-readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

As a general introduction to the subject matter described in more detail below, aspects described herein are directed towards methods, systems, computer-readable media, and apparatuses for a tiered optimization premium-based insurance system. A premium-based insurance system may utilize an unrestrained rating plan premium to perform one or more types of underwriting decisions. Rather than basing underwriting decisions on a large number of insurance factors and/or business rules, a premium-based insurance system may base underwriting decisions on a comparison of an insurance policy premium and the unrestrained rating plan premium generated by the insurance system. The insurance policy premium may be a premium determined using a traditional or conventional method. The unrestrained rating plan premium may be a premium determined using factors, interactions, rating variables, and modeling techniques which may not have been used in determining an insurance premium using a traditional or conventional method. In particular, aspects described herein may be used to accept or reject new insurance policies based on a comparison of a quoted insurance premium corresponding to the new insurance policy with an unrestrained rating plan premium. Other aspects described herein may be used to determine whether to exclude a particular type of coverage from an insurance policy. Yet other aspects described herein may be used to optimize inspection mitigation by determining if mitigation of conditions found during inspection may be waived.

FIG. 1 illustrates a block diagram of a tiered optimization computing device (or system) 101 in a computer system 100 that may be used according to one or more illustrative embodiments of the disclosure. The tiered optimization computing device 101 may have a processor 103 for controlling overall operation of the tiered optimization computing device 101 and its associated components, including RAM 105, ROM 107, input/output module 109, and memory 115. The tiered optimization computing device 101, along with one or more additional devices (e.g., terminals 141 and 151, security and integration hardware 160) may correspond to any of multiple systems or devices described herein, such as personal mobile devices, vehicle-based computing devices, insurance systems servers, external data sources and other various devices in an insurance system. These various computing systems may be configured individually or in combination, as described herein, for determining an unrestrained rating plan premium and executing underwriting decisions based on the unrestrained premium. In addition to the features described above, the techniques described herein also may be used for optimizing a particular type of coverage, such as wind coverage, or for waiving mitigation of conditions resulting from an inspection, as will be discussed more fully herein.

The Input/Output (I/O) Module 109 may include a microphone, keypad, touch screen, and/or stylus through which a user of the tiered optimization computing device 101 may provide input, and may also include one or more of a speaker for providing audio output and a video display device for providing textual, audiovisual and/or graphical output. Software may be stored within memory 115 and/or storage to provide instructions to processor 103 for enabling tiered optimization computing device 101 to perform various actions. For example, memory 115 may store software used by the tiered optimization computing device 101, such as an operating system 117, application programs 119, and an associated internal database 121. The various hardware memory units in memory 115 may include volatile and nonvolatile, removable and non-removable media implemented in any method or technology for storage of information such as computer-readable instructions, data structures, program modules, or other data. Certain devices and systems within insurance systems may have minimum hardware requirements in order to support sufficient storage capacity, processing capacity, analysis capacity, network communication, etc. For instance, in some embodiments, one or more nonvolatile hardware memory units having a minimum size (e.g., at least 1 gigabyte (GB), 2 GB, 5 GB, etc.), and/or one or more volatile hardware memory units having a minimum size (e.g., 256 megabytes (MB), 512 MB, 1 GB, etc.) may be used in a tiered optimization computing device 101 (e.g., a personal mobile device 101, personal computing device 101, premium-based insurance system server 101, etc.), in order to collect and analyze insurance information, determine insurance policy parameters, determine underwriting scores, etc., using the various devices of the insurance systems. Memory 115 also may include one or more physical persistent memory devices and/or one or more non-persistent memory devices. Memory 115 may include, but is not limited to, random access memory (RAM) 105, read only memory (ROM) 107, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 103.

Processor 103 may include a single central processing unit (CPU), which may be a single-core or multi-core processor (e.g., dual-core, quad-core, etc.), or may include multiple CPUs. Processor(s) 103 may have various bit sizes (e.g., 16-bit, 32-bit, 64-bit, 96-bit, 128-bit, etc.) and various processor speeds (ranging from 100 MHz to 5 GHz or faster). Processor(s) 103 and its associated components may allow the tiered optimization computing device 101 to execute a series of computer-readable instructions, for example, receive insurance information, determine an unrestrained rating plan premium, determine an underwriting score, and/or automatically cause rejection of an insurance policy.

The computing device (e.g., a personal mobile device, personal computing system, insurance system server, etc.) may operate in a networked environment 100 supporting connections to one or more remote computers, such as terminals 141 and 151. Such terminals may be personal computers or servers 141 (e.g., home computers, laptops, web servers, database servers), mobile communication devices 151 (e.g., mobile phones, tablet computers, etc.), and the like, each of which may include some or all of the elements described above with respect to the tiered optimization computing device 101. The network connections depicted in FIG. 1 include a local area network (LAN) 125 and a wide area network (WAN) 129, but may also include other networks. When used in a LAN networking environment, the tiered optimization computing device 101 may be connected to the LAN 125 through a network interface or adapter 123. When used in a WAN networking environment, the tiered optimization computing device 101 may include a modem 127 or other means for establishing communications over the WAN 129, such as network 131 (e.g., the Internet).

Also illustrated in FIG. 1 is a security and integration layer 160, through which communications are sent and managed between the tiered optimization computing device 101 (e.g., a personal mobile device, a vehicle-based computing device, a premium-based insurance server, an intermediary server and/or external data source servers, etc.) and the remote devices (141 and 151) and remote networks (125 and 129). The security and integration layer 160 may comprise one or more separate computing devices, such as web servers, authentication servers, and/or various networking components (e.g., firewalls, routers, gateways, load balancers, etc.), having some or all of the elements described above with respect to the tiered optimization computing device 101. As an example, a security and integration layer 160 of a server 101 may comprise a set of web application servers configured to use secure protocols and to insulate the tiered optimization computing device 101 from external devices 141 and 151. In some cases, the security and integration layer 160 may correspond to a set of dedicated hardware and/or software operating at the same physical location and under the control of same entities as tiered optimization computing device 101. For example, layer 160 may correspond to one or more dedicated web servers and network hardware in a home or policy information datacenter or in a cloud infrastructure supporting a cloud-based home or policy information data retrieval and analysis. In other examples, the security and integration layer 160 may correspond to separate hardware and software components which may be operated at a separate physical location and/or by a separate entity.

As discussed below, the data transferred to and from various devices in an insurance system 100 may include secure and sensitive data, such as insurance policy data and confidential user data from insured individuals. Therefore, it may be desirable to protect transmissions of such data by using secure network protocols and encryption, and also to protect the integrity of the data when stored on the various devices within a personalized insurance system, such as personal mobile devices, insurance servers, external data source servers, or other computing devices in the system 100, by using the security and integration layer 160 to authenticate users and restrict access to unknown or unauthorized users. In various implementations, security and integration layer 160 may provide, for example, a file-based integration scheme or a service-based integration scheme for transmitting data between the various devices in an electronic display system 100. Data may be transmitted through the security and integration layer 160, using various network communication protocols. Secure data transmission protocols and/or encryption may be used in file transfers to protect to integrity of the data, for example, File Transfer Protocol (FTP), Secure File Transfer Protocol (SFTP), and/or Pretty Good Privacy (PGP) encryption. In other examples, one or more web services may be implemented within the various devices 101 in the system 100 and/or the security and integration layer 160. The web services may be accessed by authorized external devices and users to support input, extraction, and manipulation of the data (e.g., insurance policy data, confidential user data, etc.) between the various devices 101 in the system 100. Web services built to support a personalized display system may be cross-domain and/or cross-platform, and may be built for enterprise use. Such web services may be developed in accordance with various web service standards, such as the Web Service Interoperability (WS-I) guidelines. In some examples, a web service that may provide a tiered optimized premium based insurance policy determination, a tiered optimized premium based optimization for a particular type of coverage, such as wind coverage, a tiered optimized premium based inspection optimization, or the like, may be implemented in the security and integration layer 160 using the Secure Sockets Layer (SSL) or Transport Layer Security (TLS) protocol to provide secure connections between servers 101 and various clients 141 and 151. SSL or TLS may use HTTP or HTTPS to provide authentication and confidentiality. In other examples, such web services may be implemented using the WS-Security standard, which provides for secure SOAP messages using XML encryption. In still other examples, the security and integration layer 160 may include specialized hardware for providing secure web services. For example, secure network appliances in the security and integration layer 160 may include built-in features such as hardware-accelerated SSL and HTTPS, WS-Security, and firewalls. Such specialized hardware may be installed and configured in the security and integration layer 160 in front of the web servers, so that any external devices may communicate directly with the specialized hardware.

Although not shown in FIG. 1, various elements within memory 115 or other components in system 100, may include one or more caches, for example, CPU caches used by the processing unit 103, page caches used by the operating system 117, disk caches of a hard drive, and/or database caches used to cache content from database 121. For embodiments including a CPU cache, the CPU cache may be used by one or more processors in the processing unit 103 to reduce memory latency and access time. In such examples, a processor 103 may retrieve data from or write data to the CPU cache rather than reading/writing to memory 115, which may improve the speed of these operations. In some examples, a database cache may be created in which certain data from a database 121 (e.g., insurance policy data, confidential user data, etc.) is cached in a separate smaller database on an application server separate from the database server (e.g., at a personal mobile device, or intermediary network device or cache device, etc.). For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of systems and arrangements described herein, such as faster response times and less dependence on network conditions when transmitting and receiving insurance policy data, confidential user data, insurance parameters, insurance premiums, and the like.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, Wi-Fi, and WiMAX, is presumed, and the various computing devices in insurance system components described herein may be configured to communicate using any of these network protocols or technologies.

Additionally, one or more application programs 119 may be used by the various tiered optimization computing devices 101 within a tiered optimization premium-based insurance system 100 (e.g., determining unrestrained premiums, determining underwriting scores for applications, predicting life expectancy for insurance policies, determining wind pool scores, etc.), including computer executable instructions for receiving and analyzing various insurance information, confidential user data, and the like.

Figure 2:
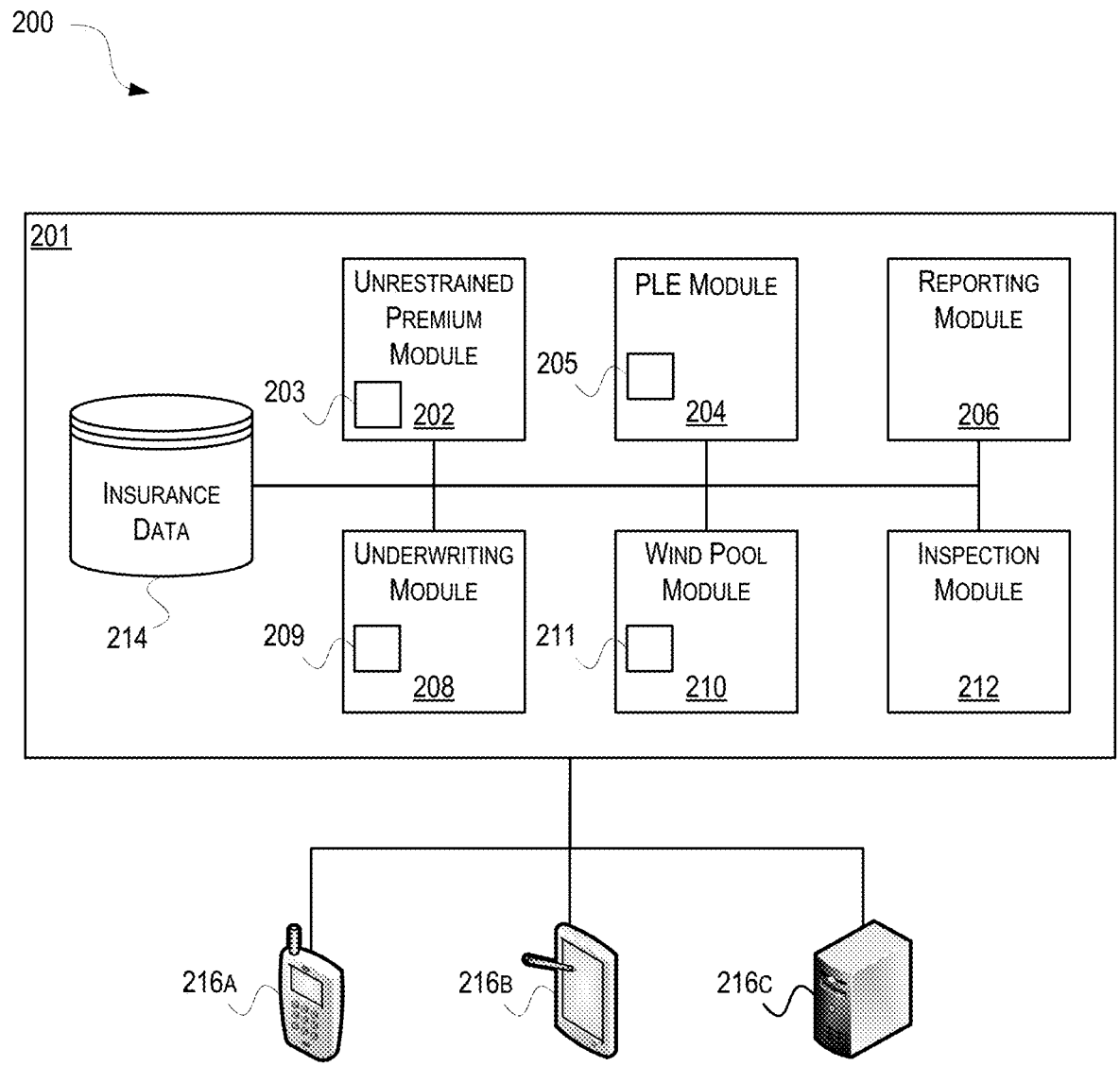
FIG. 2 depicts an illustrative block diagram of a tiered optimization premium based insurance system that may be used to implement processes and functions in accordance with one or more illustrative aspects described herein.

Referring to FIG. 2, the schematic diagram shows an illustrative tiered optimization premium based insurance system 200. The tiered optimization premium based insurance system 200 may be associated with, internal to, operated by, or the like, an entity 201, such as an insurance provider. In some examples, the entity may be one of various other types of entities, such as a government entity, corporation or business, university, or the like. Various examples described herein will be discussed in the context of an insurance provider. However, nothing in the disclosure should be viewed as limiting use of the systems, methods, arrangements, etc. described herein to use only by an insurance provider.

The tiered optimization premium based insurance system 200 illustrated in FIG. 2 is one example of a suitable operating environment and is not intended to suggest any limitation as to the scope of use or functionality of the insurance system 200. The tiered optimization premium based insurance system 200 may include one or more modules that may include hardware and/or software configured to perform various functions within insurance system 200. The one or more modules may be separate, physical devices, or, in other examples, one or more modules may be part of the same physical device.

The tiered optimization premium based insurance system 200 may comprise an unrestrained premium module 202. The unrestrained premium module 202 may comprise hardware and/or software configured to determine and/or implement a Homeowners Applied Laddered Optimization (HALO) unrestrained rating plan premium 203. The unrestrained rating plan premium 203 may be a premium determined using factors, interactions, rating variables, and modeling techniques which may not have been used in determining an insurance premium for a new or a pre-existing insurance policy. The unrestrained premium 203 may serve as a secondary unconstrained rating plan with which to compare an insurance premium determined using a traditional or conventional method. Once an unrestrained premium 203 is calculated, the unrestrained premium module 202 may provide or transmit the unrestrained premium 203 to one or more modules in the tiered optimization premium based insurance system 200 to aid in making underwriting decisions. Alternatively or additionally, one or more modules in the tiered optimization premium based insurance system 200 may request an unrestrained premium 203 from the unrestrained premium module 202. For example, an underwriting module 208 may generate an underwriting score 209 based on the unrestrained premium 203. In another example, the wind pool module 210 may use the unrestrained premium 203 to generate a wind pool score 211. In yet another example, inspection optimization logic comprised by the inspection module 212 may determine to waive mitigation of conditions identified during an inspection of an insured asset based at least in part on the unrestrained premium 203.

In one embodiment in accordance with aspects described herein, the unrestrained premium module 202 may be configured to calculate an unrestrained premium 203 based on a combination of a plurality of premium components. The premium components may comprise individual components for coverages such as house fire coverage, brush fire coverage, individual fire coverage, water coverage due to weather events, water coverage due to non-weather events, wind coverage, hail coverage, lighting coverage, theft coverage, liability coverage, hurricane coverage, and other types of coverage. The premium components included in the calculation of an unrestrained premium may vary based on a region or zone. In some embodiments, a region or zone may be a single territory. In other embodiments, a region or zone may comprise a grouping of territories. Regions or zones may be defined by a 5 digit zip code. For example, the unrestrained premium module 202 may not include the premium component for hurricane coverage for a region located within North Dakota, where hurricanes are virtually nonexistent. If or when a premium component is not used, the premium component may be zeroed out in the calculation. The premium component may be zeroed out with either a multiplicative factor of 1.000 or an additive factor of 0.00. Each premium component may be provided to a reporting module 206. The reporting module 206 may maintain and/or store one or more premium components. The premium components may be maintained and/or stored in one or more types of storage which may be capable of providing the features described herein. For example, the reporting module 206 may employ a combination of flat files, lists of key-pairs, object-oriented databases, relational databases, and the like to maintain and/or store the one or more premium components. Furthermore, the premium components may be stored in a single or multiple purposely-built computing devices, as well as in cloud-based storage devices. The reporting module 206 may be further configured to generate financial reports based on the premium components. The financial reports may be used for statistical analysis, segmented analysis, regulatory reporting, and the like. In some embodiments, the unrestrained premium module 202 may also provide the premium components to insurance data store 214 for data warehousing.

The premium components may be calculated based on a variety of factors, such as property insurance factors, auto insurance factors, individual factors of the named insured and their spouse and/or children, discounts, coverage limits, traditional policy factors, and the like. Various algorithms and/or equations may be used to determine the premium components. For example, the unrestrained premium module 202 may be configured to calculate each of the premium components based on one or more of the following property insurance factors: coverage base rate; insurance coverage (e.g., dwelling limits, deductibles, replacement cost amounts, etc.); zone (e.g. zone in which insured asset is located); town class (e.g., protective capability of responding fire department, etc.); wind/hail exclusion (e.g., whether coverage against windstorm and hail and hurricane loss is selected for a policy); dwelling characteristics (e.g., age of dwelling, number of stories, square footage, etc.); exterior construction of dwelling (e.g., brick, frame, log, fire-resistive, etc.); basement characteristics (e.g., type of foundation, percent of basement finished); house attributes (e.g., number of bathrooms, exterior wall type, garage capacity, number of fireplaces, etc.); roof characteristics (e.g., roof replacement cost, roof geometry, age of roof, roof cover type, roof square footage, etc.); residence class (e.g., primary residence, secondary residence, etc.); policy class (e.g., number of occupants, age of oldest person of interest (insured and spouse), number of vehicles, etc.); highest education level of person of interest; age of renovations (e.g., electrical, plumbing, roof, heating/cooling, etc.); presence of protective devices in dwelling (e.g., fire alarms, smoke detectors, burglar alarms); presence of loss mitigation devices in dwelling (e.g., storm shutters, roof tie-downs, etc.); prior insurance claims; number of feet to closest fire hydrant from dwelling; distance from dwelling to coastline; distance from dwelling to surrounding brush (in wildfire-prone areas interior quality of construction of dwelling; application of strict building codes to dwelling; presence of wood burning stove; dog ownership; presence of specified dog breeds; number of renewals with property insurance carrier; building frame construction of dwelling (e.g., aluminum, vinyl, stucco, etc.); internal home inspection discount; age of appliances (e.g., washing machine, dishwasher, water heater); age and/or type of heating system; age and/or type of wiring (e.g., amperage of electrical service as a function of size of home, number of occupants, etc.); existence of and number of GFI outlets; attic insulation and ventilation; existence of firewall between garage and living quarters; type of cooking fuel source; speed limit and/or traffic density of street; whether dwelling is on a cul-de-sac or corner lot or within a gated community; lot size; presence of garage or carport at dwelling; distance from tall trees to house and/or chimney; existence of motion-activated exterior floodlights; presence of fireplace; presence of chimney cap and/or spark arrester; existence of locks on windows; use of impact-resistant roofing material; use of fire-treated lumber; windbreak to west of house; direction of doors; whether prior occupants had home insurance; prior claims at address, neighborhood (not individual); prior claims by type; builder/contractor name; presence of pool, diving board, hot tub (above ground vs. in ground, fenced vs. unfenced); presence of trampoline; whether the dwelling is in a flood zone; presence of rental unit, mobile home, or other additional dwelling on property; existence of solar panels. The unrestrained premium module 202 may obtain these property insurance factors from insurance data store 214 as well as from other data stores not shown that may be internal to the entity 201 or external to the entity 201.

The unrestrained premium module 202 may be further configured to calculate each of the premium components based on one or more of the following auto insurance factors: number of vehicles, number of years with prior or current auto carrier, number of at-fault accidents, number of non at-fault accidents, number of major accidents, number of minor accidents, number of comprehensive claims. The number of accidents and comprehensive claims may be only those accidents and claims that occurred during a predetermined time period. For example, the number of accidents and comprehensive claims may cover only the prior 5 years' worth of data. The unrestrained premium module 202 may obtain these auto insurance factors from insurance data store 214 as well as from other data stores not shown that may be internal to the entity 201 or external to the entity 201.

The unrestrained premium module 202 may also be configured to calculate each of the premium components based on one or more of the following individual factors for the named insured and spouse: rent payment history, past evictions; check transaction history (e.g., TELECHECK); type of mortgage; supermarket shopping patterns; media usage patterns (magazines, television, radio); type of driver's license; out of U.S. driving experience; presence and/or type of health insurance; health/medical history; reaction time, peripheral vision, and/or similar capabilities; whether the user is a smoker; scholastic aptitude test (SAT) scores; whether the insured lives with the insured's parents; number and/or length of cell phone calls from car; past insurance policy change behavior; years in area (vs. years at residence); direct mail responder; customer care registration; ownership and/or characteristics of life insurance; purchase of extended warranties, home warranty, etc.; multiple home ownership; boat ownership; aircraft ownership; gun ownership. The unrestrained premium module 202 may obtain these property insurance factors from insurance data store 214 as well as from other data stores not shown that may be internal to the entity 201 or external to the entity 201.

The unrestrained premium module 202 may additionally be configured to calculate each of the premium components based on the presence of one or more of the following discounts: claim free discount; responsible payment discount; multiple policy discount; home buyer discount; protective device discount; storm shutter discount; hail resistant roof discount; smoke-free discount; early signing discount; pay plan discount; loyalty discount; welcome discount. The unrestrained premium module 202 may determine the presence of these property discounts based on information obtained from insurance data store 214 as well as from other data stores not shown that may be internal to the entity 201 or external to the entity 201.

In some embodiments, the unrestrained premium module 202 may also determine one or more factors based on premium factors obtained from insurance data store 214. For example, the unrestrained premium module 202 may determine an age of a dwelling by calculating a difference between a current year and a year in which the dwelling was built. Additionally or alternatively, the unrestrained premium module 202 may generate additional factors based on a combination of factors obtained from insurance data store 214. For example, the unrestrained premium module 202 may generate a replacement cost relativity factor by computing a percentage of a difference between an insured value and a replacement cost value. The unrestrained premium module 202 may assign a value to each of the one or more factors used in determining each of the premium components and may combine the one or more values to determine a total premium component. If or when a premium factor is not used, the premium factor may be zeroed out in the calculation. The premium factor may be zeroed out by assigning either a multiplicative value of 1.000 or an additive value of 0.00 to the premium factor. A premium factor may be assigned different values based on a region or zone and/or a type of premium component. For example, a premium factor related to damage prevention due to wind events may be assigned a higher value if or when a region is more likely than other regions to experience events causing wind damage (e.g., tornadoes, hurricanes, etc.). Additionally or alternatively, the premium factor related to damage prevention due to wind events may be assigned a lower value for a premium component for theft coverage. In some embodiments, the premium factor related to damage prevention due to wind events may be zeroed out in the calculation of the premium component for theft coverage.

The tiered optimization premium based insurance system 200 may comprise a predictive lifetime expectancy (PLE) module 204. The PLE module 204 may comprise hardware and/or software configured to determine and/or implement a predictive lifetime expectancy (PLE) factor 205. The PLE module 204 may provide the PLE factor 205 to one or more modules in the tiered optimization premium based insurance system 200 to aid in making underwriting decisions. Alternatively or additionally, one or more modules in the tiered optimization premium based insurance system 200 may request a PLE factor 205 from the PLE module 204. For example, an inspection module 212 may use a PLE factor 205 to determine whether to waive mitigation of conditions identified during an inspection of an insured asset. The PLE module 204 may be further configured to provide the PLE factor 205 to the reporting module 206. The reporting module 206 may maintain and/or store one or more PLE factors. The reporting module 206 may be further configured to generate financial reports based on the PLE factors. The financial reports may be used for statistical analysis, segmented analysis, regulatory reporting, and the like. In some embodiments, the PLE module 204 may also provide the PLE factor 205 to insurance data store 214 for data warehousing.

The PLE factor 205 may be based on a variety of factors, such as insurance scores, amount of insurance, presence of underlying auto policy, square footage of insured asset, number of occupants in the dwelling, age of oldest occupant in dwelling, payment method, presence of claim free discount, and the like. The PLE module 204 may obtain these factors from insurance data store 214 as well as from other data stores not shown that may be internal to the entity 201 or external to the entity 201. In some embodiments, the PLE module 204 may determine one or more factors based on factors obtained from insurance data store 214. Additionally or alternatively, the PLE module 204 may generate additional factors based on a combination of factors obtained from insurance data store 214. Various algorithms may be used to determine the PLE factor 205. For example, Equation 1 is one example that may be used to determine a PLE factor 205.

$$PLE = \frac{1}{C_F \times IS_F \times AOI_F \times AL_F \times SF_F \times O_F \times OA_F \times PM_F \times CF_F},$$

Equation 1 where

PLE is the predictive lifetime expectancy factor 205;

$C_F$ is a constant;

$IS_F$ is an insurance score group factor that may include one or more credit reports ordered in connection with a policy, and the like;

$AOI_F$ is an amount of insurance factor that may be based on an amount of coverage and a replacement cost amount;

$AL_F$ is an underlying auto customer factor that may include the presence of an underlying auto policy, and the like;

$SF_F$ is a square footage factor that may include the reported square footage of the insured dwelling, and the like;

$O_F$ is a number of occupants factor that may include the number of occupants of the insured dwelling, and the like;

$OA_F$ is an oldest occupant's age factor that may include the age of the oldest occupant of the insured dwelling, and the like;

$PM_F$ is a payment method that may a policy payment method (e.g., paid in full, paid in installments, paid by third party, etc.), and the like; and $CF_F$ is a claim free discount factor that may include number of claims, recency of claims, and the like.

Although Equation 1 is provided as an example for determining PLE factor 205, various other equations and/or algorithms may be used. For instance, one or more factors may be removed from the equation to determine the PLE factor 205. Additionally or alternatively, other factors may be included in the equation, without departing from the disclosure.

As illustrated in FIG. 2, the tiered optimization premium based insurance system 200 may comprise an underwriting module 208. The underwriting module 208 may comprise hardware and/or software configured to determine and/or implement an underwriting score 209. The underwriting module 208 may determine an underwriting score 209 based on a comparison of an insurance policy premium quote and an unrestrained premium 203. For example, the insurance policy premium may have been quoted to a customer by entity 201. The underwriting module 208 may obtain the insurance policy premium quote from insurance data store 214. The unrestrained premium module 202 may provide the unrestrained premium 203 to the underwriting module 208. In some embodiments, the underwriting module 208 may request the unrestrained premium 203 from the unrestrained premium module 202. The underwriting module 208 may be further configured to provide the underwriting score 209 to the reporting module 206. The reporting module 206 may maintain and/or store one or more underwriting scores. The reporting module 206 may be further configured to generate financial reports based on the underwriting scores. The financial reports may be used for statistical analysis, segmented analysis, regulatory reporting, and the like. In some embodiments, the underwriting module 208 may also provide the underwriting score 209 to insurance data store 214 for data warehousing.

As discussed above, the underwriting score 209 may be based on a comparison of an insurance policy premium quote and an unrestrained premium 203. Various algorithms may be used to effect such a comparison to produce an underwriting score 209. For example, Equation 2 is one example that may be used to determine an underwriting score 209 based on a percentage of a difference between an insurance policy premium and an unrestrained premium 203.

$$US = \frac{P_P - H_P}{P_P} \times 100,$$

Equation 2 where

US is the underwriting score 209;

$P_P$ is an insurance policy premium quote; and $H_P$ is an unrestrained premium 203.

Although Equation 2 is provided as an example for determining an underwriting score 209, those of skill in the art will appreciate that various other equations and/or algorithms may be used without departing from the disclosure. For instance, other factors may be included in the equation, or other mathematical operations may be used.

Further, the underwriting module 208 may determine an underwriting score threshold indicator based on a comparison of the underwriting score 209 with an underwriting score threshold. The underwriting score threshold indicator may indicate whether an underwriting score 209 meets an underwriting score threshold. The underwriting module 208 may obtain an underwriting score threshold from insurance data store 214. In some embodiments, the underwriting score threshold may vary by region or zone. For example, the underwriting score threshold may vary by zip code. In some embodiments, the underwriting module 208 may be configured to monitor one or more factors within a region or zone and dynamically modify the underwriting score threshold based on the monitoring. In other embodiments, the underwriting score threshold may be determined based on the type of policy and/or coverage.

The underwriting score threshold indicator may be used to determine whether to accept or reject new insurance policies. The underwriting module 208 may perform the underwriting determination during a risk assessment phase of a quoting process. For example, if or when an underwriting score 209 is below the underwriting score threshold, the underwriting score threshold indicator may indicate rejection of a new insurance policy. If or when a new insurance policy is rejected, the insurance policy may not be offered to a customer. Similarly, a rejected insurance policy may not be approved for issuance. In another example, if or when an underwriting score 209 meets the underwriting score threshold, the underwriting score threshold indicator may indicate acceptance of a new insurance policy. If or when a new insurance policy is accepted, the insurance policy may be offered to a customer. Similarly, an accepted insurance policy may be further reviewed prior to issuance. Once the underwriting score threshold indicator is determined, the underwriting module 208 may be further configured to provide the underwriting score threshold indicator to the reporting module 206. The reporting module 206 may maintain and/or store one or more underwriting score threshold indicators. The reporting module 206 may be further configured to generate financial reports based on the underwriting score threshold indicators. The financial reports may be used for statistical analysis, segmented analysis, regulatory reporting, and the like. In some embodiments, the underwriting module 208 may also provide the underwriting score threshold indicator to insurance data store 214 for data warehousing.

In other examples, the underwriting module 208 may be configured to determine whether an insurance policy may be issued or may be rejected based on a plurality of traditional rejection conditions. In examples in which the underwriting determination is based on traditional policy rejection conditions (either in combination with an underwriting score threshold indicator-based condition or alone), the traditional rejection conditions, such as claim history, condition of dwelling, location of dwelling, coverages, deductibles, policy limits, and the like, may be obtained from, for example, the insurance data store 214. In some examples, the underwriting module 208 may group each of the traditional rejection conditions and the underwriting score threshold indicator-based condition into one of three priority-based profiles. The underwriting module 208 may determine the priority of the rejection conditions based on a risk or probability of occurrence associated with the condition. Alternatively or additionally, the underwriting module 208 may determine the priority of the rejection conditions based on a severity associated with the condition. In other examples, the priority of the rejection conditions may be obtained from the insurance data store 214. The first priority-based profile may comprise one or more traditional rejection conditions with a high priority. For example, the one or more rejection conditions comprised in the first priority-based profile may have a priority ranking of 1. The second priority-based profile may comprise an underwriting score threshold indicator-based condition. The second priority-based profile may be assigned a medium priority. For example, the second priority-based profile may have a priority ranking of 2. The third priority-based profile may comprise one or more traditional rejection conditions with a low priority. For example, the one or more rejection conditions comprised in the third priority-based profile may have a priority ranking of 3.

Each of the rejection conditions in the three priority-based profiles may be evaluated by the underwriting module 208 to determine if the rejection condition is present. If or when at least one rejection condition in the first priority-based profile is present, the underwriting module 208 may reject the new insurance policy. Once the underwriting module 208 rejects a new insurance policy based on a high priority rejection condition, the underwriting module 208 may cause the display of all applicable and/or present high priority and low priority rejection conditions via a computing device, such as one or more of computing devices 216a-216c. For instance, the underwriting decision may be displayed via an application (e.g., online or mobile application) on a smartphone 216a, tablet 216b, or other computing device 216c. In addition to display of the underwriting decision, various other insurance policy details may be displayed as desired. Additionally or alternatively, the underwriting module 208 may also cause a rejection letter to be delivered to the customer. The rejection letter may comprise all applicable and/or present high priority and low priority rejection conditions that caused the rejection.

In some instances, if or when the underwriting score threshold indicator indicates that the threshold is not met and at least one low priority rejection condition is present, the underwriting module 208 may reject the new insurance policy based on the applicable and/or present low priority rejection conditions. The underwriting module 208 may cause the display of all applicable and/or present low priority rejection conditions via a computing device, such as one or more of computing devices 216a-216c. Additionally or alternatively, the underwriting module 208 may also cause a rejection letter comprising all applicable and/or present low priority rejection conditions to be delivered to the customer.

In other instances, if or when the underwriting score threshold indicator indicates that the threshold is not met and no low priority rejection conditions are present, the underwriting module 208 may reject the new insurance policy based on the presence of the medium priority condition. The underwriting module 208 may cause the display of the underwriting decision via a computing device, such as one or more of computing devices 216a-216c. Additionally or alternatively, the underwriting module 208 may also cause a rejection letter to be delivered to the customer.

In yet other instances, if or when no high or medium priority rejection conditions are present, the underwriting module 208 may accept the new insurance policy, even if a low priority condition is present. The underwriting module 208 may cause the display of the underwriting decision via a computing device, such as one or more of computing devices 216a-216c. Additionally or alternatively, the underwriting module 208 may also prevent a rejection letter from being delivered to the customer.

Further, although three levels of priority are described in the above examples, more or fewer levels of priority may be provided without departing from the disclosure.

As further illustrated in FIG. 2, the tiered optimization premium based insurance system 200 may comprise a wind pool module 210. The wind pool module 210 may comprise hardware and/or software configured to determine and/or implement a wind pool score 211. The wind pool module 210 may determine a wind pool score 211 based on a comparison of an insurance policy premium with wind coverage and an unrestrained premium 203. The wind pool module 210 may obtain the insurance policy premium with wind coverage from insurance data store 214. The unrestrained premium module 202 may provide the unrestrained premium 203 to the wind pool module 210. In some embodiments, the wind pool module 210 may request the unrestrained premium 203 from the unrestrained premium module 202. The wind pool module 210 may be further configured to provide the wind pool score 211 to the reporting module 206. The reporting module 206 may maintain and/or store one or more wind pool scores. The reporting module 206 may be further configured to generate financial reports based on the wind pool scores. The financial reports may be used for statistical analysis, segmented analysis, regulatory reporting, and the like. In some embodiments, the wind pool module 210 may also provide the wind pool score 211 to insurance data store 214 for data warehousing.

As discussed above, the wind pool score 211 may be based on a comparison of an insurance policy premium with wind coverage and an unrestrained premium 203. Various algorithms may be used to effect such a comparison to produce a wind pool score 211. For example, Equation 3 is one example that may be used to determine a wind pool score 211 based on a percentage of a difference between an insurance policy premium with wind coverage and an unrestrained premium 203.

$$WPS = \frac{P_W - H_W}{P_W} \times 100, \quad \text{Equation 3}$$

where

WPS is the wind pool score 211;

$P_W$ is an insurance policy premium with wind coverage using an existing rating plan; and $H_W$ is an unrestrained premium 203 with wind coverage.

Although Equation 2 is provided as an example for determining a wind pool score 211, those of skill in the art will appreciate that various other equations and/or algorithms may be used without departing from the disclosure. For instance, other factors may be included in the equation, or other mathematical operations may be used.

Further, the wind pool module 210 may determine a wind pool threshold indicator based on a comparison of the wind pool score 211 with a wind pool threshold. The wind pool threshold indicator may indicate whether a wind pool score 211 meets a wind pool threshold. The wind pool module 210 may obtain a wind pool threshold from insurance data store 214. In some embodiments, the underwriting score threshold may vary by region or zone. For example, the wind pool threshold may vary by coastal bands. In other embodiments, the wind pool module 210 may be configured to monitor one or more factors within a region or coastal band and dynamically modify the wind pool threshold based on the monitoring. In other embodiments, the wind pool threshold may be determined based on a wind pool score 211 and a PLE factor 205. For example, the wind pool module 210 may obtain a table comprising one or more combinations of wind pool score 211 and PLE factor 205 values mapped to one or more wind pool threshold values. The wind pool module 210 may use such a table to determine a wind pool threshold based on a wind pool score 211 and a PLE factor 205. In another example, the wind pool module 210 may execute one of various algorithms which may evaluate and/or combine a wind pool score 211 and a PLE factor 205 to determine a wind pool threshold.

The wind pool threshold indicator may be used to determine whether to exclude or require wind coverage on insurance policies. The wind pool module 210 may evaluate the wind pool threshold indicator during a risk assessment phase of a quoting process. Additionally, the wind pool threshold indicator may be re-evaluated if or when a wind coverage deductible or limit is modified on an insurance policy. For example, if or when a wind pool score 211 is below the wind pool threshold, the wind pool threshold indicator may indicate exclusion of wind coverage on an insurance policy. In another example, if or when a wind pool score 211 is above the wind pool threshold, the wind pool threshold indicator may indicate that wind coverage is required on an insurance policy. Once the wind pool threshold indicator is determined, the wind pool module 210 may be further configured to provide the wind pool threshold indicator to the reporting module 206. The reporting module 206 may maintain and/or store one or more wind pool threshold indicators. The reporting module 206 may be further configured to generate financial reports based on the wind pool threshold indicator. The financial reports may be used for statistical analysis, segmented analysis, regulatory reporting, and the like. In some embodiments, the wind pool module 210 may also provide the wind pool threshold indicator to insurance data store 214 for data warehousing.

In some embodiments, the wind pool module 210 may request the underwriting module 208 to further evaluate an insurance policy if or when wind coverage is excluded from the insurance policy. The underwriting module 208 may determine whether the insurance policy may be issued or may be rejected with the wind exclusion present. In other embodiments, the wind pool module 210 may request the underwriting module 208 to further evaluate an insurance policy if or when wind coverage is required on the insurance policy. The underwriting module 208 may determine whether the insurance policy may be issued or may be rejected with wind coverage present.

Although the tiered optimization premium based insurance system 200 described herein comprises a wind pool module 210, various other conditions may have similar modules configured to perform similar functions for the particular condition. It will become apparent to those of skill in the art that a premium based insurance system may comprise similarly configured modules for other types of coverage, such as earthquake, hail, fire, and the like.

The tiered optimization premium based insurance system 200 may comprise an inspection module 212. The inspection module 212 may comprise hardware and/or software configured to determine and/or implement an inspection optimization algorithm. The inspection optimization algorithm may determine whether to waive mitigation of conditions comprised within inspection results of an insured asset. The inspection optimization decision may be based on a comparison of a lifetime premium with loss component with a lifetime premium after mitigation component. The inspection module 212 may determine a lifetime premium with loss component and a lifetime premium after mitigation component based on a variety of factors such as an insurance policy premium, an underwriting score 209, a PLE factor 205, and the like. The inspection module 212 may obtain the insurance policy premium from insurance data store 214. The underwriting module 208 may provide the underwriting score 209 to the inspection module 212. In some embodiments, the inspection module 212 may request the underwriting score 209 from underwriting module 208. Similarly, the inspection module may request a PLE factor 205 from PLE module 204. The inspection module 212 may obtain inspection results which may comprise one or more conditions from insurance data store 214, as well as from other data stores not shown that may be internal to the entity 201 or external to the entity 201.

In some embodiments, the inspection may have been performed via physical examination of the property (either via an inspector being present at the location or via one or more cameras or other devices configured to transmit images of the property for evaluation and inspection). In other embodiments, the inspection may have been performed via search and/or examination of publicly available images and records. The inspection results may comprise conditions that may prevent issuance of an insurance policy unless mitigated. For example, conditions identified during an inspection may be one or more of the following: adjacent exposure (e.g., brush, commercial, debris, distance to shore, vacancy, etc.); attractive nuisance (e.g., trampoline, etc.); brick exterior (e.g., collapsing, cracking, crumbling, separating, tuck pointing, etc.); chimney (e.g., collapsing, cracking, crumbling, leaning, separating, tuck pointing, etc.); debris (e.g., blocking entranceways, on stairs, etc.); detached structure (e.g., boarded up, collapsing, dry rot, glass broken, roof, etc.); doors (e.g., boarded up, damaged, dry rot, glass broken, missing, needs paint, etc.); electrical system (e.g., bypassed fuses, coin behind fuse, empty socket, exposed wiring, inadequate amperage, knob and tube, overloaded, severely frayed, severely worn, etc.); fence (e.g., collapsing, leaning, rotted, etc.); foundation (e.g., cracking, crumbling, not continuous, on stilts, open, etc.); gutters/downspouts (e.g., damaged, detached, hanging, missing, rusted out, sections missing, etc.); heating system (e.g., flammable items close, gas leakage, improper wiring, needs service, etc.); interior floors/carpeting (e.g., depression, holes, sections missing, uneven, water damage, worn, etc.); interior walls/ceiling (e.g., cracking, crumbling, holes, needs paint, water damage, etc.); plumbing system (e.g., broken fixtures, cracked fixtures, defective faucets, evidence of severe leakage, etc.); pool (e.g., is empty, no locking steps, not fenced in, etc.); porch (e.g., crumbling, dry rot, falling, leaning, no railing, etc.); roof (e.g., clawed, curled, damaged, damaged valleys, dry rot, lifting/buckled, moss build-up, patched, snow covered, uneven/wavy, etc.); satellite dish (e.g., improper installation, etc.); sidewalks/driveway (e.g., cracking, crumbling, heaving, missing, uneven, etc.); siding/frame exterior (e.g., damaged, dry rot, hanging, missing, paint peeling, patched, etc.); soffits/fascia/eaves (e.g., damaged, detached, dry rot, hanging, holes, missing, needs paint, etc.); stairs (e.g., falling apart, loose handrail, loose/uneven tread, missing handrail, rotted, unlighted, etc.); steps (e.g., crumbling, dry rot, falling, leaning, missing, no railing, etc.); trees (e.g., falling, leaning, over-hanging, rotted, etc.); dwelling under construction (e.g., not completed, renovation, etc.); vicious dogs (or other animals) (e.g., boxer, chow, Doberman, pit bull, Rottweiler, shepherd, etc.); water heater (e.g., flammable items close, improperly secured, leaking, located outside, rust, etc.); windows (e.g., boarded up, damaged, dry rot, glass broken, needs paint, etc.); wood burning stove (e.g., dirty chimney, improper clearances, improper installation, needs maintenance, no smoke detector, etc.); yard/porch (e.g., presence of appliances, debris, discarded autos, ditches, holes, trash, trip hazards, etc.).

The inspection module 212 may cause a policy to be marked acceptable, accepted with conditions, or unacceptable. For example, a policy may be marked acceptable if or when inspection results for the policy comprised no conditions that required mitigation. In another example, a policy may be marked accepted with conditions if or when the policy meets the inspection optimization logic even in the presence of at least one condition that required mitigation. In yet another example, a policy may be marked unacceptable if or when the policy fails to meet the inspection optimization logic. The inspection module 212 may be further configured to provide the inspection optimization decision to the reporting module 206. The reporting module 206 may maintain and/or store one or more inspection optimization decisions. The reporting module 206 may be further configured to generate financial reports based on the inspection optimization decisions. The financial reports may be used for statistical analysis, segmented analysis, regulatory reporting, and the like. In some embodiments, the inspection module 212 may also provide the inspection optimization decision to insurance data store 214 for data warehousing.

As discussed above, the inspection module 212 may determine a lifetime premium with loss based on a variety of factors such as an insurance policy premium, an underwriting score 209, a PLE factor 205, and the like. Various algorithms may be used to determine the lifetime premium with loss. For example, Equation 4 is one example that may be used to determine a lifetime premium with loss.

$$LP_L = P_L \times US_L \times PLE_L / 100 - S_L, \text{ where} \qquad \text{Equation 4:}$$

$LP_L$ is the lifetime premium with loss;
$P_L$ is an insurance policy premium;
$US_L$ is an underwriting score 209 (determined by underwriting module 208);
$PLE_L$ is a PLE factor 209 (determined by PLE module 208); and
$S_L$ is a severity factor based on an expected claim amount that may result from one or more conditions identified during inspection. The severity factor may vary by inspection condition. The inspection module 212 may obtain a severity factor for each identified condition in the inspection results from insurance data store 214 as well as from other data stores not shown that may be internal to the entity 201 or external to the entity 201. Alternatively or additionally, the severity factor may be provided in a table format comprising a severity factor for all available conditions. For example, the inspection module 212 may determine the severity factor by searching severity factor table for each of the one or more conditions that may be comprised in the inspection results. Furthermore, the inspection module 212 may combine a totality of severity factors for each of the one or more conditions that may be comprised in the inspection results. For example, the inspection module 212 may add together all the severity factors that may be indicated by the inspection results and use the sum result as the severity factor in Equation 4.

Although Equation 4 is provided as an example for determining a lifetime premium with loss, those of skill in the art will appreciate that various other equations and/or algorithms may be used without departing from the disclosure. For instance, one or more factors may be removed from the equation to determine the lifetime premium with loss. Additionally or alternatively, other factors may be included in the equation, without departing from the disclosure.

The inspection module 212 may be further configured to provide the lifetime premium with loss component to the reporting module 206. The reporting module 206 may maintain and/or store one or more lifetime premium with loss components. The reporting module 206 may be further configured to generate financial reports based on the lifetime premium with loss components. The financial reports may be used for statistical analysis, segmented analysis, regulatory reporting, and the like. In some embodiments, the inspection module 212 may also provide the lifetime premium with loss component to insurance data store 214 for data warehousing.

As further discussed above, the inspection module 212 may determine a lifetime premium after mitigation based on a variety of factors such as an insurance policy premium, an underwriting score 209, a PLE factor 205, and the like. Similar to the determination of the lifetime premium with loss, various algorithms may be used to determine the lifetime premium after mitigation. For example, Equation 5 is one example that may be used to determine a lifetime premium after mitigation.

$$LP_M = P_M \times US_M \times PLE_M \times PM_M \pm 100, \text{ where} \qquad \text{Equation 5:}$$

$LP_L$ is the lifetime premium after mitigation;
$P_M$ is an insurance policy premium;
$US_M$ is an underwriting score 209 (determined by underwriting module 208);
$PLE_M$ is a PLE factor 209 (determined by PLE module 208); and
$PM_M$ is a probability of mitigation condition factor based on an expected probability that the insured may mitigate the condition if or when requested to do so. The probability of mitigation condition factor may vary by inspection condition. The inspection module 212 may obtain a probability of mitigation condition factor for each identified condition in the inspection results from insurance store 214 as well as from other data stores not shown that may be internal to the entity 201 or external to the entity 201. Alternatively or additionally, the probability of mitigation condition factor may be provided in a table format comprising a probability of mitigation condition factor for all available conditions.

For example, the inspection module 212 may determine the probability of mitigation condition factor by searching the probability of mitigation condition factor table for each of the one or more conditions that may be comprised in the inspection results. Furthermore, the inspection module 212 may use the lowest probability of mitigation condition factors of all the conditions that may be comprised in the inspection results. For example, if inspection results comprise condition 1 with a probability of 40%, condition 2 with a probability of 30%, and condition 3 with a probability of 85%, then the inspection module 212 may use the condition 2 probability to determine the lifetime premium with mitigation.

Although Equation 5 is provided as an example for determining a lifetime premium after mitigation, those of skill in the art will appreciate that various other equations and/or algorithms may be used without departing from the disclosure. For instance, one or more factors may be removed from the equation to determine the lifetime premium after mitigation. Additionally or alternatively, other factors may be included in the equation, without departing from the disclosure.

The inspection module 212 may be further configured to provide the lifetime premium after mitigation component to the reporting module 206. The reporting module 206 may maintain and/or store one or more lifetime premium after mitigation components. The reporting module 206 may be further configured to generate financial reports based on the lifetime premium after mitigation components. The financial reports may be used for statistical analysis, segmented analysis, regulatory reporting, and the like. In some embodiments, the inspection module 212 may also provide the lifetime premium after mitigation component to insurance data store 214 for data warehousing.

The inspection optimization logic comprised by inspection module 212 may be further configured to perform a comparison of the lifetime premium with loss and the lifetime premium after mitigation, as discussed above. Various algorithms may be used to perform such a comparison to produce an inspection optimization decision. For example, the inspection module 212 may determine to waive mitigation of the conditions comprised in the inspection results if or when the lifetime premium with loss is greater than the lifetime premium after mitigation. Additionally or alternatively, the inspection module 212 may produce an inspection optimization decision that may be set to accepted with conditions if or when the lifetime premium with loss is greater than the lifetime premium after mitigation. In another example, the inspection module 212 may generate an inspection optimization decision that may be set to unacceptable if or when the lifetime premium with loss is less than or equal to the lifetime premium after mitigation.

The tiered optimization premium based insurance system 200 may also comprise an insurance data store 214. The insurance data store 214 may contain information belonging to or maintained by an insurance company, government entity, and/or third-party entity. For privacy protection reasons, access to the information in the insurance data store 214 may be restricted to only authorized computing devices and for only permissible purposes. For example, an insurance data store 214 may comprise a computer internal to an insurance company that contains customer policy information, such as information about entities insured by the customer (e.g., homes, cars, boats, etc.) or insurance premium information for one or more policies held by the customer. The insurance data store 214 may also contain information, including but not limited to, the customer's relevant amount of insurance and/or deductibles with insurance carriers, the customer's address information and other personal information, replacement cost information for insured entities, and any other information apparent to one skilled in the art.

In another example, insurance data store 214 may contain insurance rating information from one or more third-party entities. Some such entities' databases include, but are not limited to, the Comprehensive Loss Underwriting Exchange (CLUE®) and Current Carrier™ Database by CHOICE POINT, Automated Property Loss Underwriting System (A-PLUS™), and other reliable information sources. The CLUE® database is a national insurance industry database containing historical insurance claim information on individuals and/or their properties (e.g., vehicle, home, etc.). The A-PLUS™ database is a data store of information from nearly 1300 insurance companies contributing reports of property claims. The Current Carrier™ database includes information pertaining to the existence and length of any lapse in coverage; both vehicle (e.g., automobile) and property coverage. The information in a Current Carrier™ Database database, like the information in the other third-party databases, may be communicated to tiered optimization premium based insurance system 200 for use in calculating an unrestrained rating plan premium.

In another example, insurance data store 214 may also contain predefined business rules and other information to enable the methods disclosed herein. For example, the insurance data store 214 may contain data related to property attributes, policy coverage, policy discounts, and homeowner claim history. This data may be used, among other things, to optimize wind coverage and/or insurance underwriting decision techniques used in one or more illustrative aspects described herein.

Furthermore, insurance data store 214 may contain underwriting score thresholds and wind pool thresholds which may be used to optimize wind coverage and/or perform insurance underwriting decisions. In some implementations, the underwriting score thresholds and the wind pool thresholds stored in insurance data store 216 may include location information so that differences in thresholds in various geographic areas may be identified.

The communication between modules 202, 204, 206, 209, 210, 212, insurance data store 214, and computing devices 216a-216c may be through wired or wireless communication networks. The modules and other devices (e.g., data store 214, devices 216a-216c) may be connected to one or more of the networks via twisted pair wires, coaxial cable, fiber optics, radio waves, or other media. The term "network" as used herein and depicted in the drawings should be broadly interpreted to include not only systems in which remote databases are coupled together via one or more communication paths, but also stand-alone devices that may be coupled, from time to time, to such systems that have storage capability. Consequently, the term "network" includes not only a "physical network" but also a "content network," which is comprised of the data—attributable to a single entity--which resides across all physical networks.

FIG. 2 illustrates just one example of a system architecture that may be used, and those of skill in the art will appreciate that the specific system architecture and computing devices used may vary, and are secondary to the functionality that they provide, as further described herein. For example, the functionality provided by one or more modules may be combined into a single module.

Additionally, one or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 3:
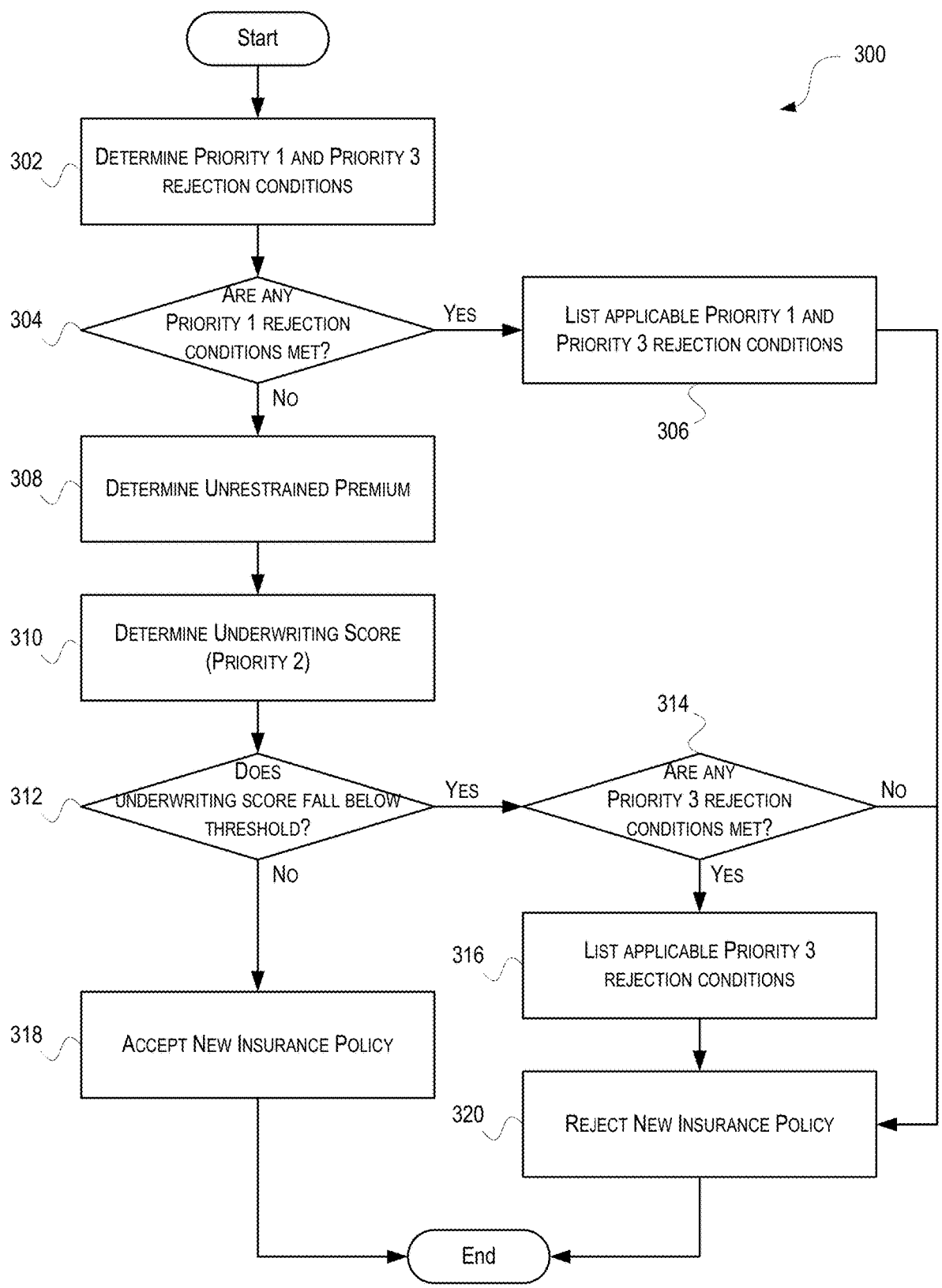
FIG. 3 illustrates a flow chart of a method of using an unrestrained premium to optimize underwriting decisions in accordance with one or more illustrative aspects described herein.

FIG. 3 depicts an example method of using an unrestrained premium to optimize underwriting decisions according to one or more illustrative aspects described herein. At step 302, the underwriting module 208 may group a plurality of traditional rejection conditions (e.g., claim history, condition of dwelling, location of dwelling, coverages, deductibles, policy limits, etc.), either in combination with an underwriting score threshold indicator-based condition or alone, into one of three priority-based profiles. The underwriting module 208 may determine the priority of the rejection conditions based on a risk or probability of occurrence associated with the condition. Alternatively or additionally, the underwriting module 208 may determine the priority of the rejection conditions based on a severity associated with the condition. The first priority-based profile may comprise one or more traditional rejection conditions with priority value of 1. The second priority-based profile may comprise an underwriting score threshold indicator-based condition. The third priority-based profile may comprise one or more traditional rejection conditions with priority value of 3. Referring to step 302, the underwriting module 208 may evaluate each of the priority 1 rejection conditions and the priority 3 rejection conditions to determine which priority 1 or priority 3 rejection conditions are present. In step 304, the underwriting module 208 may determine whether at least one rejection condition with priority 1 is present. If or when it is determined, in step 304, that at least one priority 1 rejection condition is present, the underwriting module 208 may cause the display of all applicable and/or present high priority and low priority rejection conditions via a computing device, such as one or more of computing devices 216a-216c, as shown in step 306. In step 320, the underwriting module 208 may reject the new insurance policy. Additionally or alternatively, the underwriting module 208 may also cause a rejection letter to be delivered to the customer. The rejection letter may comprise all applicable and/or present high priority and low priority rejection conditions that caused the rejection. The method ends after completion of step 320.

If or when it is determined that no priority 1 rejection conditions are present, then the underwriting module 208 may request an unrestrained premium 203 from the unrestrained premium module 202, as shown in step 308. Additionally or alternatively, the unrestrained premium module 202 may provide the unrestrained premium 203 to the underwriting module 208. In step 310, the underwriting module 208 may calculate an underwriting score 209 as discussed above. In step 312, the underwriting module 208 may determine whether underwriting score 209 falls below the underwriting score threshold. If or when it is determined that the underwriting score meets the underwriting score threshold, the underwriting module 208 may accept the new insurance policy, even if a low priority condition is present, and the method ends. The underwriting module 208 may cause the display of the underwriting decision via a computing device, such as one or more of computing devices 216a-216c. Additionally or alternatively, the underwriting module 208 may also prevent a rejection letter from being delivered to the customer.

If or when it is determined that the underwriting score falls below the underwriting score threshold, in step 314, the underwriting module 208 may determine whether at least one rejection condition with priority 3 is present. If or when it is determined, in step 314, that at least one priority 3 rejection condition is present, the underwriting module 208 may cause the display of all applicable and/or present low priority rejection conditions via a computing device, such as one or more of computing devices 216a-216c, as shown in step 316. In step 320, the underwriting module 208 may reject the new insurance policy. Additionally or alternatively, the underwriting module 208 may also cause a rejection letter to be delivered to the customer. The rejection letter may comprise all applicable and/or present low priority rejection conditions that caused the rejection. If or when it is determined, in step 314, that no priority 3 rejection conditions are present, the underwriting module 208 may reject the new insurance policy based on the presence of the medium priority condition. The underwriting module 208 may cause the display of the underwriting decision via a computing device, such as one or more of computing devices 216a-216c. Additionally or alternatively, the underwriting module 208 may also cause a rejection letter to be delivered to the customer. The method ends after completion of step 320.

Figure 4:
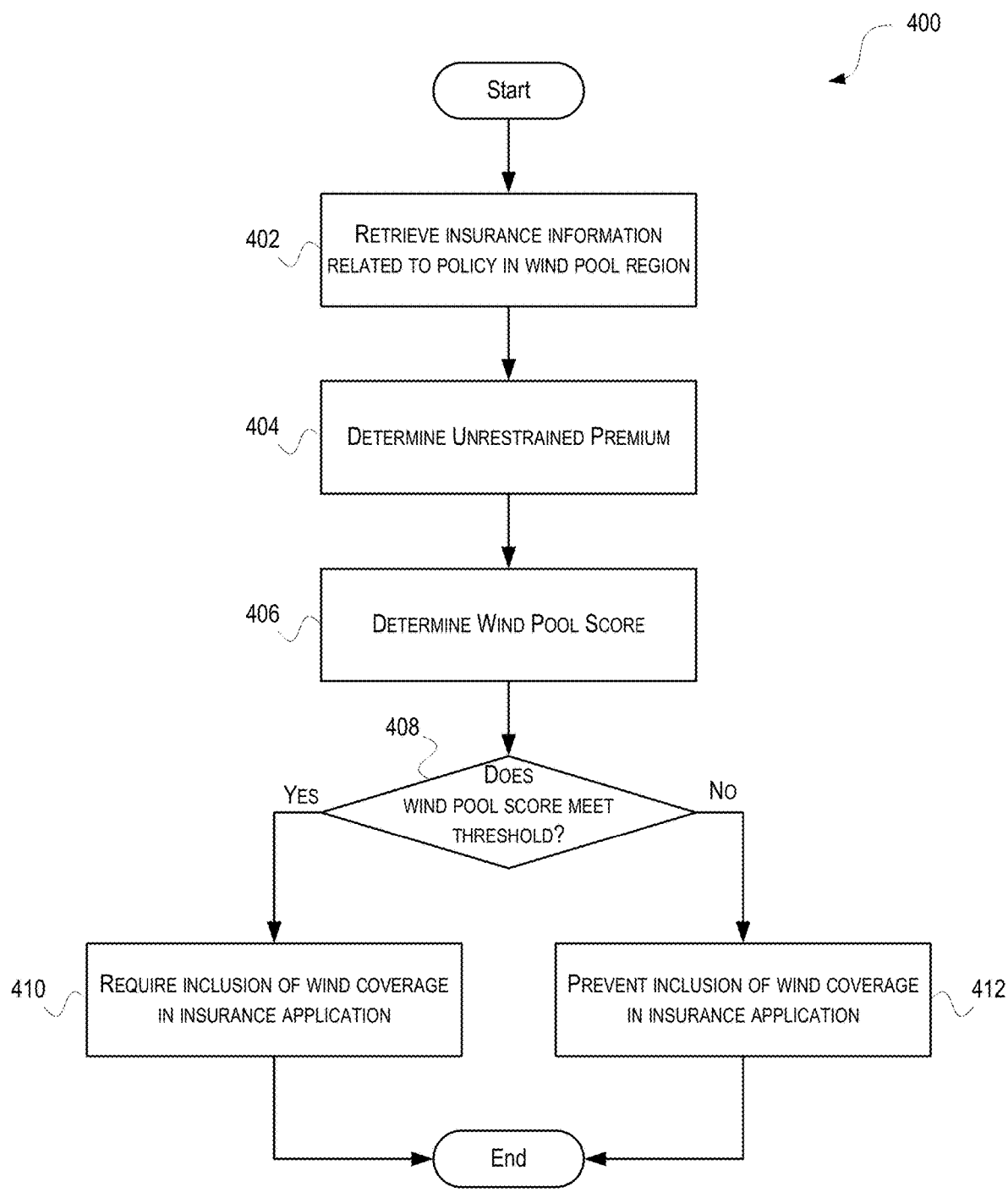
FIG. 4 illustrates a flow chart of a method used to optimize a particular type of coverage based on an unrestrained premium in accordance with one or more illustrative aspects described herein.

FIG. 4 depicts an example method of using an unrestrained premium to optimize a particular type of coverage according to one or more illustrative aspects described herein. At step 402, the wind pool module 210 may retrieve insurance information related to policy in a wind pool region. For example, the wind pool module 210 may obtain the insurance policy premium with wind coverage from insurance data store 214. In step 404, the wind pool module 210 may request an unrestrained premium 203 from the unrestrained premium module 202. Additionally or alternatively, the unrestrained premium module 202 may provide the unrestrained premium 203 to the wind pool module 210. The wind pool module 210 may calculate a wind pool score 211 as discussed above, as shown in step 406. In step 408, the wind pool module 210 may determine whether the wind pool score 211 meets a wind pool threshold. The wind pool module 210 may obtain a wind pool threshold from insurance data store 214. In some embodiments, the underwriting score threshold may vary by region or zone. For example, the wind pool threshold may vary by coastal bands. In other embodiments, the wind pool threshold may be determined based on a wind pool score 211 and a PLE factor 205. For example, the wind pool module 210 may obtain a table comprising one or more combinations of wind pool score 211 and PLE factor 205 values mapped to one or more wind pool threshold values. The wind pool module 210 may use such a table to determine a wind pool threshold based on a wind pool score 211 and a PLE factor 205. In another example, the wind pool module 210 may execute one of various algorithms which may evaluate and/or combine a wind pool score 211 and a PLE factor 205 to determine a wind pool threshold.

If or when, in step 408, the wind pool module 210 determines that the wind pool score meets the wind pool threshold, the wind pool module 210 may require inclusion of wind coverage in the insurance application, as shown in step 410. In some embodiments, the wind pool module 210 may request the underwriting module 208 to further evaluate an insurance policy if or when wind coverage is required on the insurance policy. The underwriting module 208 may determine whether the insurance policy may be issued or may be rejected with wind coverage present. The method ends after completion of step 410.

If or when, in step 408, the wind pool module 210 determines that the wind pool score does not meet the wind pool threshold, the wind pool module 210 may prevent inclusion of wind coverage in the insurance application, as shown in step 412. In some embodiments, the wind pool module 210 may request the underwriting module 208 to further evaluate an insurance policy if or when wind coverage is excluded from the insurance policy. The underwriting module 208 may determine whether the insurance policy may be issued or may be rejected with the wind exclusion present. The method ends after completion of step 412.

Figure 5:
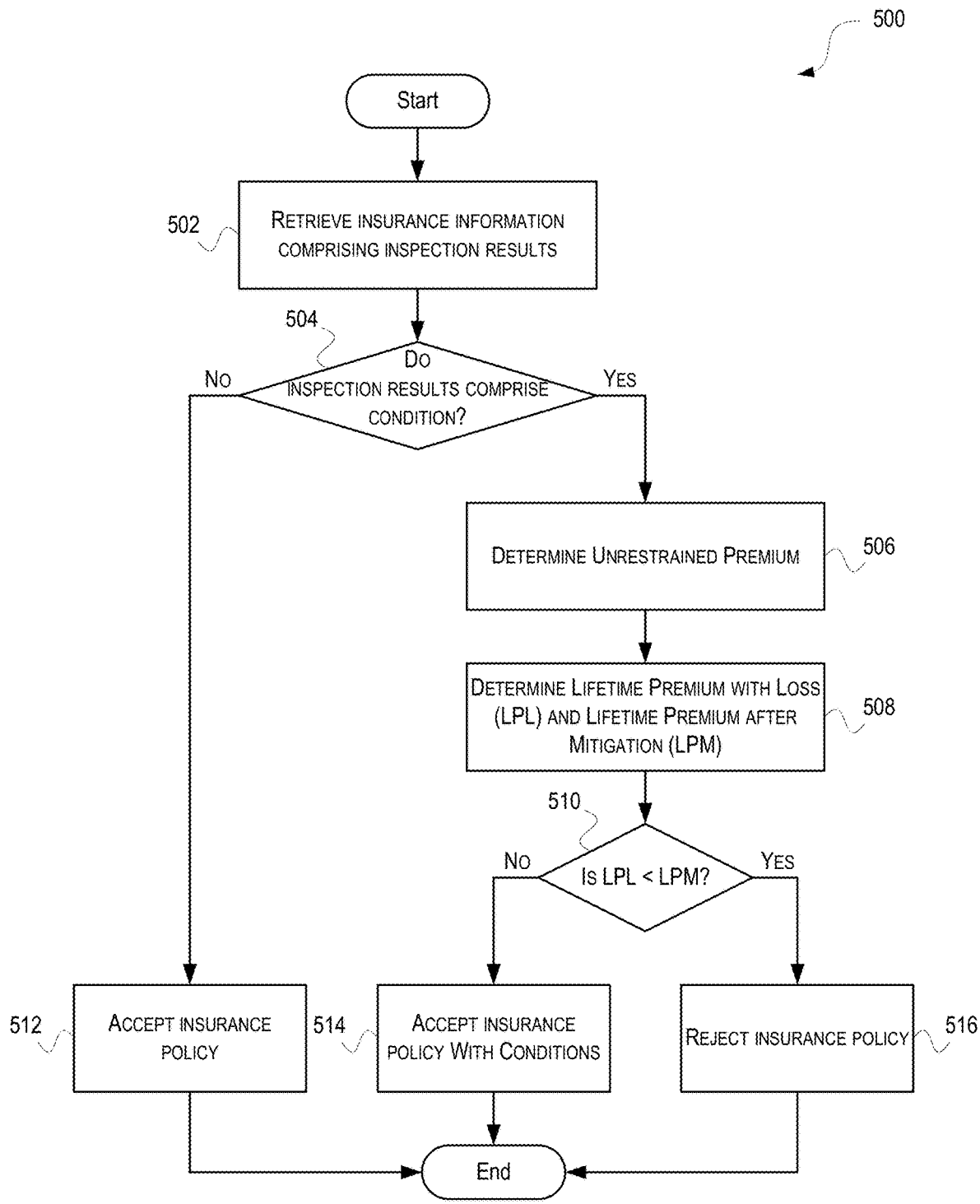
FIG. 5 illustrates a flow chart of a method of using an unrestrained premium to optimize inspections in accordance with one or more illustrative aspects described herein.

FIG. 5 depicts an example method of using an unrestrained premium to optimize inspections according to one or more illustrative aspects described herein. At step 502, the inspection module 212 may retrieve insurance information comprising inspection results. For example, the inspection module 212 may obtain insurance policy premium and inspection results from insurance data store 214. The inspection results may comprise one or more conditions identified during inspection that may prevent issuance of an insurance policy unless mitigated. In step 504, the inspection module 212 may determine whether the inspection results comprise at least one condition that might require mitigation. If or when the inspection module 212 determines that the inspection results comprised no conditions that required mitigation, the inspection module 212 may mark the policy as acceptable and cause acceptance of the policy, as shown in step 512, and the method ends.

If or when, in step 504, the inspection module 212 determines that the inspection results comprise at least one condition that might require mitigation, the inspection module 212 may request an unrestrained premium 203 from the unrestrained premium module 202. Additionally or alternatively, the unrestrained premium module 202 may provide the unrestrained premium 203 to the inspection module 212. In step 508, the inspection module 212 may determine a lifetime premium with loss (LPL) and a lifetime premium after mitigation (LPM), as discussed above. In step 510, the inspection module may determine whether LPL is less than LPM. If or when it is determined that LPL is less than LPM, the inspection module 212 may waive mitigation of the at least one condition determined in step 504 and mark the policy as accepted with conditions, as shown in step 514. The method ends after completion of step 514.

If or when it is determined that LPL is greater than or equal to LPM, the inspection module 212 may mark the policy as unacceptable and reject the insurance policy, as shown in step 516, and the method ends.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A system, comprising:
   one or more insurance system database caches providing insurance information related to an insurance policy, the insurance information including an insurance policy premium;
   an unrestrained premium device communicably coupled to the one or more insurance system database caches, the unrestrained premium device receiving the insurance information from the one or more insurance system database caches and determining an unrestrained rating plan premium based on a plurality of premium components, wherein the plurality of premium components comprise at least one multiplicative factor and at least one additive factor determined from the insurance information, and wherein the unrestrained rating plan premium is determined using modeling techniques different from modeling techniques used to generate the insurance policy premium; and
   a predictive life expectancy component predicting a life expectancy associated with the insurance policy;
   a wind pool component determining whether to provide wind coverage based on a wind pool threshold, the wind pool threshold being based on the prediction of the life expectancy;
   an inspection module component, wherein the inspection module component optimizes an inspection process by implementing an inspection optimization algorithm, and wherein the inspection optimization algorithm determines whether to waive mitigation of conditions comprised within inspection results associated with the insurance policy based on the prediction of the life expectancy; and
   an underwriting device communicably coupled to the unrestrained premium device, at least one of the underwriting device, the predictive life expectancy component, the wind pool component, and the inspection module component:
      determining an underwriting score based on the unrestrained rating plan premium and the insurance policy premium;
      determining a first underwriting score threshold based on a geographical region;
      dynamically modifying the first underwriting score threshold to a second underwriting score threshold responsive to monitoring of one or more underwriting factors within the geographical region;
      comparing the underwriting score to the second underwriting score threshold;
      responsive to determining that the underwriting score fails to meet the second underwriting score threshold, causing rejection of the insurance policy, the rejection of the insurance policy being further based on the whether to provide the wind coverage; and causing, via a communication network, display of the rejection of the insurance policy on a user computing device.

2. The system of claim 1, wherein, to determine that the underwriting score fails to meet the second underwriting score threshold, the underwriting device:
   determines a first set of rejection conditions with a first priority;
   determines a second set of rejection conditions with a second priority, wherein the second priority is lower than the first priority, and wherein the second set of rejection conditions comprises the underwriting score; and
   determines a third set of rejection conditions with a third priority, wherein the third priority is lower than the second priority.

3. The system of claim 2, wherein, to determine that the underwriting score fails to meet the second underwriting score threshold, the underwriting device:
   determines whether at least one rejection condition in the first set of rejection conditions is met; and
   responsive to the determining that the at least one rejection condition in the first set of rejection conditions is met, causes listing of the first set of rejection conditions and of the third set of rejection conditions as reasons for rejecting the insurance policy and causing the listing to display on the user computing device.

4. The system of claim 2, wherein, to determine that the underwriting score fails to meet the second underwriting score threshold, the underwriting device:
   determines whether at least one rejection condition in the second set of rejection conditions is met and whether no rejection conditions in the third set of rejection conditions are met; and
   responsive to the determining that the at least one rejection condition in the second set of rejection conditions is met and no rejection conditions are met in the third set of rejection conditions, causes listing of a predetermined message on the user computing device.

5. The system of claim 2, wherein, to determine that the underwriting score fails to meet the second underwriting score threshold, the underwriting device:
   determines whether at least one rejection condition in the second set of rejection conditions is met and whether at least one rejection condition in the third set of rejection conditions are met; and
   responsive to the determining that the at least one rejection condition in the second set of rejection conditions is met and that the at least one rejection condition in the third set of rejection conditions is met, causes listing of the third set of rejection conditions as reasons for rejecting the insurance policy and causing display of the listing on the user computing device.

6. The system of claim 1, wherein, to determine the underwriting score, the underwriting device is configured to:
   calculates a ratio between the insurance policy premium and the unrestrained rating plan premium.

7. The system of claim 1, wherein the first underwriting score threshold and the second underwriting score threshold vary based on a location of an asset insured by the insurance policy.

8. The system of claim 1, wherein the plurality of premium components is based on at least one of: property attributes, policy coverage, policy discount, or claim history.

9. A method, comprising:
   providing, at one or more insurance system database caches, insurance information related to an insurance policy, wherein the insurance information comprises an insurance policy premium;
   receiving, at an unrestrained premium device communicably coupled to the one or more insurance system database caches, the insurance information from the one or more insurance system database caches and determining, at the unrestrained premium device, an unrestrained rating plan premium based on a plurality of premium components, wherein the plurality of premium components comprise at least one multiplicative factor and at least one additive factor determined from the insurance information, and wherein the unrestrained rating plan premium is determined using modeling techniques different from modeling techniques used to generate the insurance policy premium;
   predicting, at a predictive life expectancy component communicably coupled to an underwriting device, a life expectancy associated with the insurance policy;
   determining, at a wind pool component communicably coupled to the underwriting device, whether to provide wind coverage based on a wind pool threshold, the wind pool threshold being based on the prediction of the life expectancy;
   optimizing, at an inspection module component, an inspection process by implementing an inspection optimization algorithm, wherein the inspection optimization algorithm determines whether to waive mitigation of conditions comprised within inspection results associated with the insurance policy based on the prediction of the life expectancy;
   determining, at the underwriting device communicably coupled to the unrestrained premium device, an underwriting score based on the unrestrained rating plan premium and the insurance policy premium;
   determining, at the underwriting device, a first underwriting score threshold based on a geographical region;
   dynamically modifying, at the underwriting device, the first underwriting score threshold to a second underwriting score responsive to monitoring of one or more underwriting factors within the geographical region;
   comparing, by the underwriting device, the underwriting score to the second underwriting score threshold;
   responsive to determining that the underwriting score fails to meet the second underwriting score threshold, cause, at the underwriting device, rejection of the insurance policy, the rejection of the insurance policy being further based on the whether to provide the wind coverage; and
   cause, at the underwriting device and via a communication network, display of the rejection of the insurance policy on a user computing device.

10. The method of claim 9, wherein the determining that the underwriting score fails to meet the second underwriting score threshold comprises:
   determining, at the underwriting device, a first set of rejection conditions with a first priority;
   determining, at the underwriting device, a second set of rejection conditions with a second priority, wherein the second priority is lower than the first priority, and wherein the second set of rejection conditions comprises the underwriting score; and
   determining, at the underwriting device, a third set of rejection conditions with a third priority, wherein the third priority is lower than the second priority.

11. The method of claim 10, wherein the determining that the underwriting score fails to meet the second underwriting score threshold further comprises:
- determining, at the underwriting device, whether at least one rejection condition in the first set of rejection conditions is met; and
- responsive to the determining that the at least one rejection condition in the first set of rejection conditions is met, causing, at the underwriting device, listing of the first set of rejection conditions and of the third set of rejection conditions as reasons for rejecting the insurance policy and causing the listing to display on the user computing device.

12. The method of claim 10, wherein the determining that the underwriting score fails to meet the second underwriting score threshold further comprises:
- determining, at the underwriting device, whether at least one rejection condition in the second set of rejection conditions is met and whether no rejection conditions in the third set of rejection conditions are met; and
- responsive to the determining that the at least one rejection condition in the second set of rejection conditions is met and no rejection conditions are met in the third set of rejection conditions, causing, at the underwriting device, listing of a predetermined message on the user computing device.

13. The method of claim 10, wherein the determining that the underwriting score fails to meet the second underwriting score threshold further comprises:
- determining, at the underwriting device, whether at least one rejection condition in the second set of rejection conditions is met and whether at least one rejection condition in the third set of rejection conditions are met; and
- responsive to the determining that the at least one rejection condition in the second set of rejection conditions is met and that the at least one rejection condition in the third set of rejection conditions is met, causing, at the underwriting device, listing of the third set of rejection conditions as reasons for rejecting the insurance policy and causing display of the listing on the user computing device.

14. The method of claim 9, wherein the determining the underwriting score comprises:
- calculating, at the underwriting device, a ratio between the insurance policy premium and the unrestrained rating plan premium.

15. The method of claim 9, wherein the first underwriting score threshold and the second underwriting score threshold vary based on a location of an asset insured by the insurance policy.

16. The method of claim 9, wherein the plurality of premium components is based on at least one of: property attributes, policy coverage, policy discount, and claim history.

17. One or more non-transitory computer-readable media storing computer-executable instructions that, when executed by a computing device, cause the computing device to:
- providing, at one or more insurance system database caches, insurance information related to a new insurance policy, wherein the insurance information comprises an insurance policy premium;
- receive, at an unrestrained premium device communicably coupled to the one or more insurance system database caches, the insurance information from the insurance system database caches and determine, at the unrestrained premium device, an unrestrained rating plan premium based on a plurality of premium components, wherein the plurality of premium components comprise at least one multiplicative factor and at least one additive factor determined from the insurance information, and wherein the unrestrained rating plan premium is determined using modeling techniques different from modeling techniques used to generate the insurance policy premium;
- predicting, at a predictive life expectancy component communicably coupled to an underwriting device, a life expectancy associated with the insurance policy;
- determining, at a wind pool component communicably coupled to the underwriting device, whether to provide wind coverage based on a wind pool threshold, the wind pool threshold being based on the prediction of the life expectancy;
- optimizing, at an inspection module component, an inspection process by implementing an inspection optimization algorithm, wherein the inspection optimization algorithm determines whether to waive mitigation of conditions comprised within inspection results associated with the insurance policy based on the prediction of life expectancy;
- determine, at the underwriting device communicably coupled to the unrestrained premium device, an underwriting score based on the unrestrained rating plan premium and the insurance policy premium;
- determine, at the underwriting device, a first underwriting score threshold based on a geographical region;
- dynamically modify, at the underwriting device, the first underwriting score threshold to a second underwriting score threshold responsive to monitoring of one or more underwriting factors within the geographical region;
- compare, at the underwriting device, the underwriting score to the second underwriting score threshold;
- responsive to determining that the underwriting score fails to meet the second underwriting score threshold, cause, at the underwriting device, rejection of the new insurance policy, the rejection of the insurance policy being further based on the whether to provide the wind coverage; and
- cause, at the underwriting device and via a communication network, display of the rejection of the new insurance policy on a user computing device.

18. The one or more non-transitory computer-readable media of claim 17, wherein the determining that the underwriting score fails to meet the second underwriting score threshold comprises:
- determining, at the underwriting device, a first set of rejection conditions with a first priority;
- determining, at the underwriting device, a second set of rejection conditions with a second priority, wherein the second priority is lower than the first priority, and wherein the second set of rejection conditions comprises the underwriting score; and
- determining, at the underwriting device, a third set of rejection conditions with a third priority, wherein the third priority is lower than the second priority.

19. The one or more non-transitory computer-readable media of claim 18, wherein the determining that the underwriting score fails to meet the second underwriting score threshold further comprises:
- determining, at the underwriting device, whether at least one rejection condition in the first set of rejection conditions is met; and responsive to the determining that the at least one rejection condition in the first set of rejection conditions is met, causing, at the underwriting device, listing of the first set of rejection conditions and of the third set of rejection conditions as reasons for rejecting the new insurance policy and causing the listing to display on the user computing device.

20. The one or more non-transitory computer-readable media of claim 18, wherein the determining that the underwriting score fails to meet the second underwriting score threshold further comprises:

determining, at the underwriting device, whether at least one rejection condition in the second set of rejection conditions is met and whether no rejection conditions in the third set of rejection conditions are met; and responsive to the determining that the at least one rejection condition in the second set of rejection conditions is met and no rejection conditions are met in the third set of rejection conditions, causing, at the underwriting device, listing of a predetermined message on the user computing device.

\* \* \* \* \*